United States Patent
Schaevitz et al.

(10) Patent No.: US 8,092,944 B2
(45) Date of Patent: *Jan. 10, 2012

(54) STRESSED THIN-FILM MEMBRANE ISLANDS

(75) Inventors: Samuel B. Schaevitz, Fremont, CA (US); Aleksander Franz, Winchester, MA (US); Roger W. Barton, Grand Marais, MN (US)

(73) Assignee: Lilliputian Systems, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/397,764

(22) Filed: Mar. 4, 2009

(65) Prior Publication Data

US 2010/0003575 A1 Jan. 7, 2010

Related U.S. Application Data

(63) Continuation of application No. 10/948,084, filed on Sep. 23, 2004, now Pat. No. 7,517,603.

(60) Provisional application No. 60/505,547, filed on Sep. 23, 2003.

(51) Int. Cl.
*H01M 8/00* (2006.01)
*H01M 8/10* (2006.01)

(52) U.S. Cl. ........ 429/400; 429/479; 429/535; 429/465; 429/491; 429/482; 210/321.6; 210/321.84

(58) Field of Classification Search .................. None
See application file for complete search history.

(56) References Cited

U.S. PATENT DOCUMENTS

| 2003/0012994 A1 | 1/2003 | Kushibiki et al. |
| 2003/0082431 A1* | 5/2003 | Klitsner et al. ................. 429/38 |

FOREIGN PATENT DOCUMENTS

| EP | 1 261 059 | 11/2002 |
| EP | 1 359 635 | 11/2003 |
| WO | WO-00/20106 | 4/2000 |
| WO | WO-02/43177 | 5/2002 |

OTHER PUBLICATIONS

Bruschi et al, "Technology of integrable free-standing yttria-stabilized zirconia membranes," Thin Solid Films, 346:251-254 (1999).

* cited by examiner

*Primary Examiner* — Benjamin Kurtz
(74) *Attorney, Agent, or Firm* — Sunstein Kann Murphy & Timbers LLP

(57) ABSTRACT

A structure including a support defining an opening, and a tensilely stressed thin-film membrane disposed to occlude the opening, the membrane contacting at least a portion of the support. The stressed membrane includes a material having a characteristic crack spacing greater than one-half of a minimum dimension of the membrane and less than ten times the minimum dimension. A structure including a support defining a opening having a minimum opening dimension, and a compressively stressed thin-film membrane disposed to occlude the opening, the membrane contacting at least a portion of the support. The stressed membrane includes a membrane material having a critical aspect ratio for buckling that is greater than a ratio of one-half of the minimum opening dimension to a thickness of the membrane, and the critical aspect ratio for buckling is less than a ratio of ten times the minimum opening dimension to the thickness of the membrane.

22 Claims, 11 Drawing Sheets

STRESSED THIN-FILM MEMBRANE ISLANDS

RELATED APPLICATION

This application claims the benefit of U.S. Provisional Application 60/505,547 filed Sep. 23, 2003, the entire disclosure of which is hereby incorporated by reference.

FIELD OF THE INVENTION

The invention relates generally to stressed membranes and specifically to stressed thin-film membranes for which fluidic access is required to both sides of the membrane.

BACKGROUND

Many commercial applications require the separation of two fluids, e.g., gasses or liquids, by using a membrane. The membrane is selected to mediate the interaction of the two fluids. For example, in a hydrogen purification system, the membrane may mediate the interaction of a hydrogen-rich stream at high pressure from a pure hydrogen stream at lower pressure. In this example, the membrane may be constructed from a material that allows hydrogen diffusion at a higher rate than other components of the hydrogen-rich stream. In another example, a membrane in a fuel cell may mediate the interaction of an oxygen-containing fluid with a fuel-containing fluid. The fuel cell membrane may include multiple layers that allow one or more types of ions to pass through the membrane to oxidize the fuel, while extracting electrical energy from that reaction.

To improve performance and decrease system size, it is often desirable to miniaturize membrane-containing systems. However, the materials that can readily be manufactured in a miniaturized fashion are not always compatible with the materials that are optimal for membrane functionality. Integration of these two materials sets may result in substantial stresses in the membrane. Stress may be induced by, for example, different thermal expansion rates of the membrane and a supporting structure.

A specific example of a need for miniaturization may be found in the area of batteries and fuel cells. The proliferation of portable electronics, including cellular telephones and laptop computers, has increased the demand on power storage devices, such as batteries. Fuel cells may be used to increase energy storage available in comparison to batteries. The fuel cell system, however, must be miniaturized to fit within the small form-factors of existing batteries. One example of a type of fuel cell is a solid oxide fuel cell, which is known to have high efficiency. One common miniaturization technique employs silicon (Si) substrates and integrated circuit manufacturing technologies. Silicon expands at a rate of approximately 4 micrometers per meter per degree Celsius ($\mu$m/m/° C.). Conventional solid oxide fuel cells use materials that expand at a rate of approximately 10 $\mu$m/m/° C., and operate at temperatures of about 800° C. Combining a conventional solid oxide fuel cell membrane with conventional silicon manufacturing may cause a significant expansion mismatch of approximately 0.5%, leading to highly stressed membranes. Additional factors contributing to the stress may include intrinsic stress of the thin film as deposited, tensile or compressive stress induced by sintering or other thermal processing, and chemical modifications inducing tensile or compressive stresses. High stresses in the thin-film membranes may cause mechanical failure of the film or the stress level may undesirably change material properties.

Design of fuel cell membranes, such as yttrium-stabilized zirconia (YSZ) on Si substrates, may require a free-standing YSZ thin film to stretch over a 1 millimeter (mm) to a 1 centimeter (cm) diameter. These membranes may fail because these membranes may be pliable or prone to buckling. Furthermore, YSZ membranes may also fail when cooled into the tensile state because of crack propagation.

SUMMARY

The invention relates to the formation of stressed thin-film membranes substantially free of cracks, configured so that fluidic contact to both sides of the membranes is possible.

In the particular case of a tensilely stressed film fully bonded to a rigid support, channel fractures or cracks in a web-like pattern may form in the film. A distance between adjacent cracks is observed not to be random, but rather to cluster near a characteristic crack spacing. This phenomenon is well known in the field of thin film fracture mechanics.

Reducing lateral dimensions of the tensilely stressed film below this characteristic crack spacing helps prevent the film from cracking. In order to produce larger active areas of stressed material, arrays of islands of stressed films may be formed.

The existing techniques of island formation cannot be readily adapted for the formation of tensilely stressed membranes, i.e., membrane structures that allow fluidic access to both sides of a film. The requirement for fluidic contact means that stressed membranes cannot be disposed over solid support structures.

In the particular case of a compressively stressed membrane, the lack of a supporting structure may result in expansion and warping of the membrane. This warping may be undesirable for various applications, and may also cause cracking of the membrane.

Providing good adhesion to the substrate such that the bonding energy is larger than the energy in the stressed material may help prevent compressive failure. However, this existing technique of improved adhesion cannot be readily adapted for the formation of stressed membranes.

A structure in accordance with the invention is a small tensilely stressed membrane that has only a slight overlap with a supporting structure, i.e., a support grid. The total dimensions of the stressed material, including freestanding and bonded areas, are designed to be sufficiently small so that the membrane is unlikely to fracture in tension. The allowable dimensions for a tensilely stressed membrane are dictated by the characteristic crack spacing. Materials at the bond interface, i.e., the support grid, affect the characteristic crack spacing, and therefore also affect the allowed dimensions of the membrane.

In an embodiment, the available active area is increased by the construction of islands arranged such that the spacing between islands is relatively small. This embodiment may be referred to as "pre-cracking" of the film because of the similarities between the intentional spacings and the cracks that would have formed if not for the creation of the spacings. The support structure may be a support grid aligned under the spaces with a small overlap with the stressed film. The dimensions of the support structure are designed according to design rules presented below so that the film is unlikely to crack in tension.

Another structure in accordance with the invention is a small compressively stressed membrane that is bonded to the support material. The allowable dimensions of the free-standing area of the film are designed according to design rules presented below so that the membrane is unlikely to buckle in compression.

In one embodiment, a support grid is provided to which the membrane may be bonded, and a method is provided for forming an appropriate seal around an outer edge of the membrane. The support grid, including a material such as silicon-rich silicon nitride, helps provide stiffness to the membrane structure, as well as reduces the probability of warping. A small island of stressed thin-film material is rigidly bonded to a support material over an annulus near an outer edge of the island. Additional areas located throughout the film may also be bonded.

In an embodiment, the available active area is increased by the construction of compressively stressed membranes arranged such that the spacing between membranes is relatively small. Adjacent membranes may be formed from a continuous section of thin-film material. The dimensions of the support structure are designed according to design rules presented below so that the support structure is unlikely to buckle in compression.

A third structure in accordance with the invention combines the features of the above two structures to accommodate membranes which may be under tensile and compressive stress at various operating conditions, times, or locations. This structure is a small stressed membrane that has only a slight overlap with the supporting structure, i.e., a support grid. The total dimensions of the stressed material, including freestanding and bonded areas, are designed to be sufficiently small so that the membrane is unlikely to fracture in tension according to the tensile design rules presented below. The allowable dimensions for the support opening are based on the dimensions calculated using the compressive design rules presented below. Materials at the bond interface, i.e., the support grid, affect the characteristic crack spacing, and therefore also affect the allowed dimensions of the membrane.

The membranes of the invention may be designed to survive repeated thermal cycling. These membranes may be, for example, micro-electro-mechanical system (MEMS) based solid-oxide fuel cell membranes.

In an aspect, the invention features a structure including a support defining a first opening, and a first tensilely stressed thin-film membrane disposed to occlude the first opening, the first stressed thin-film membrane contacting at least a first portion of the support. The first tensilely stressed thin-film membrane includes a membrane material having a characteristic crack spacing greater than one-half of a minimum dimension of the first stressed thin-film membrane and less than ten times the minimum dimension.

One or more of the following features may be included. The support may define a second opening adjacent to the first opening, the structure also including a second tensilely stressed thin-film membrane disposed to occlude the second opening, the second stressed thin-film membrane contacting at least a second portion of the support. The second tensilely stressed thin-film membrane may include the membrane material and the characteristic crack spacing is greater than one-half of a minimum dimension of the second stressed thin-film membrane and less than ten times the minimum dimension of the second tensilely stressed thin-film membrane. A distance between the first and second openings may be less than the minimum dimension of each opening.

The membrane may be disposed in an array and the array may include a plurality of stressed thin-film membranes and openings. A shape of the opening may be hexagonal, square, triangular, or circular. A cross-sectional portion of the support may define a first shelf and an extension, and the stressed thin-film membrane may contact a portion of the first shelf. The cross-sectional portion of the support may define a second shelf disposed in parallel to the first shelf, and the stressed thin-film membrane may contact a portion of the second shelf. The characteristic crack spacing may be less than 1 mm. The stressed thin-film membrane may be disposed in an electrochemical system, e.g., a solid oxide fuel cell, or in a membrane-based hydrogen separation system.

The stressed thin-film membrane may include a material such as copper, nickel, palladium, platinum, rhenium, silicon carbide, aluminum nitride, an oxide, and/or combinations thereof. The oxide may be, e.g., an oxide of aluminum, cerium, chromium, cobalt, hafnium, iron, lanthanum, magnesium, manganese, samarium, scandium, silicon, strontium, titanium, ytterbium, yttrium, zirconium, praseodymium, and/or combinations thereof.

In another aspect, the invention features a structure including a support defining a first opening having a minimum opening dimension, and a first compressively stressed thin-film membrane disposed to occlude the first opening, the first stressed thin-film membrane contacting at least a first portion of the support. The first compressively stressed thin-film membrane includes a membrane material, a critical aspect ratio for buckling of the membrane material is greater than a ratio of one-half of the minimum dimension of the first opening to a thickness of the stressed thin-film membrane, and the critical aspect ratio for buckling is less than a ratio of ten times the minimum dimension of the first opening to the thickness of the stressed thin-film membrane.

One or more of the following features may be included. The support may define a second opening adjacent to the first opening, and a second compressively stressed thin-film membrane may be disposed to occlude the second opening, the second stressed thin-film membrane contacting at least a second portion of the support. The second compressively stressed thin-film membrane may include the membrane material, a critical aspect ratio for buckling of the membrane material may be greater than a ratio of one-half of a minimum dimension of the second opening to a thickness of the stressed thin-film membrane, the critical aspect ratio for buckling may be less than a ratio of ten times the minimum dimension of the first opening to the thickness of the stressed thin-film membrane, and the critical aspect ratio for buckling may be less than a ratio of ten times the minimum dimension of the second opening to the thickness of the stressed thin-film membrane.

A distance between the first and second openings may be less than the minimum dimension of each opening.

The membrane may be disposed in an array, the array including a plurality of first stressed thin-film membranes and openings, and a critical aspect ratio for buckling of the array is less than the ratio of a minimum dimension of the array to the effective array thickness. The critical aspect ratio for buckling of the membrane material may be less than 40:1. The shape of the opening may be, e.g., hexagonal, square, triangular, or circular. A cross-sectional portion of the support may define a first shelf and an extension, and the stressed thin-film membrane may contact a portion of the first shelf. The cross-sectional portion of the support may define a second shelf disposed in parallel to the first shelf, and the stressed thin-film membrane may contact a portion of the second shelf.

The characteristic crack spacing may be less than 1 mm. The stressed thin-film membrane may be disposed in an electrochemical system, e.g., a solid oxide fuel cell or a membrane-based hydrogen separation system.

The stressed thin-film membrane may include a material such as copper, nickel, palladium, platinum, rhenium, silicon carbide, aluminum nitride, an oxide, and/or combinations thereof. The oxide may be, e.g., an oxide of aluminum, cerium, chromium, cobalt, hafnium, iron, lanthanum, magnesium, manganese, samarium, scandium, silicon, strontium, titanium, ytterbium, yttrium, zirconium, praseodymium, and combinations thereof.

In another aspect, the invention features a structure including a support defining a first opening, and a first stressed thin-film membrane comprising a membrane material disposed to occlude the first opening, the first stressed thin-film membrane contacting at least a first portion of the support. At a first operating condition, the first stressed thin-film membrane is tensilely stressed and the membrane material has a characteristic crack spacing greater than one-half of a minimum dimension of the first stressed thin-film membrane and less than ten times the minimum dimension. At a second operating condition, the first stressed thin-film membrane is compressively stressed and a critical aspect ratio for buckling of the membrane material is greater than a ratio of one-half of a minimum dimension of the first opening to a thickness of the stressed thin-film membrane, and the critical aspect ratio for buckling is less than a ratio of ten times the minimum dimension of the first opening to the thickness of the stressed thin-film membrane.

In another aspect, the invention features a method of forming the structures described above, including the steps of forming a support defining an opening, and forming a stressed thin-film membrane to occlude the opening.

One or more of the following features may be included. A substrate may be provided, forming the support includes forming the support in at least a region of a substrate, and the stressed thin-film membrane contacts both the support and the substrate. At least a portion of the substrate may be removed. An additional material may be deposited onto the stressed thin-film membrane.

Forming the support may include forming a sacrificial layer over the substrate, defining a cavity in the substrate and the sacrificial layer, at least partially filling the cavity with a support material, and removing at least a portion of the sacrificial layer to expose at least a portion of a top surface of the support material.

The foregoing, and other features and advantages of the invention, as well as the invention itself, will be more fully understood from the description and drawings that follow.

The drawings are not necessarily to scale, emphasis instead generally being placed upon illustrating the principles of the invention. The advantages of the invention can be better understood by reference to the description taken in conjunction with the accompanying drawings.

DETAILED DESCRIPTION

Figure 1:
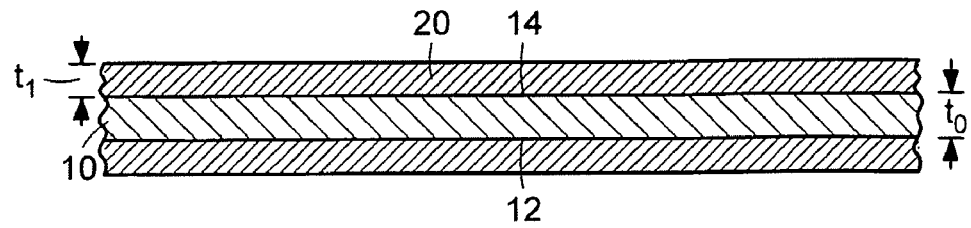
FIGS. 1-11G are schematic cross-sectional and top views of the fabrication of an embodiment of the invention and schematic top views of masks used therein.
Figure 2A:
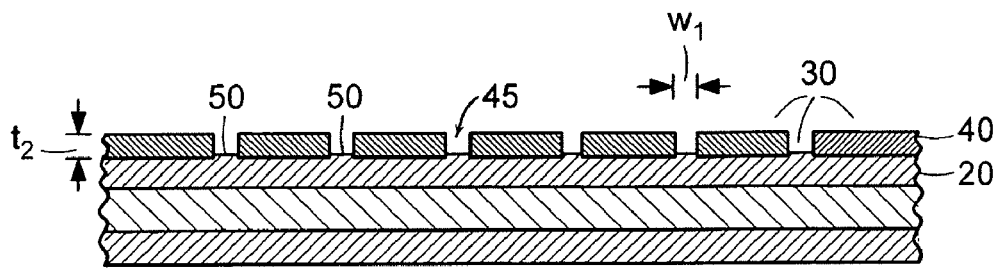
Figure 2B:
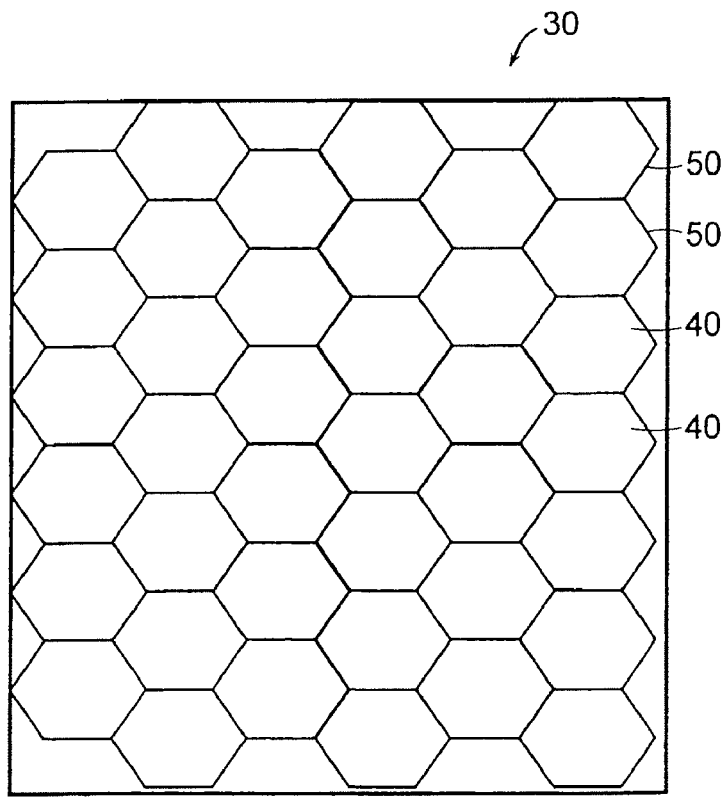
Figure 2C:
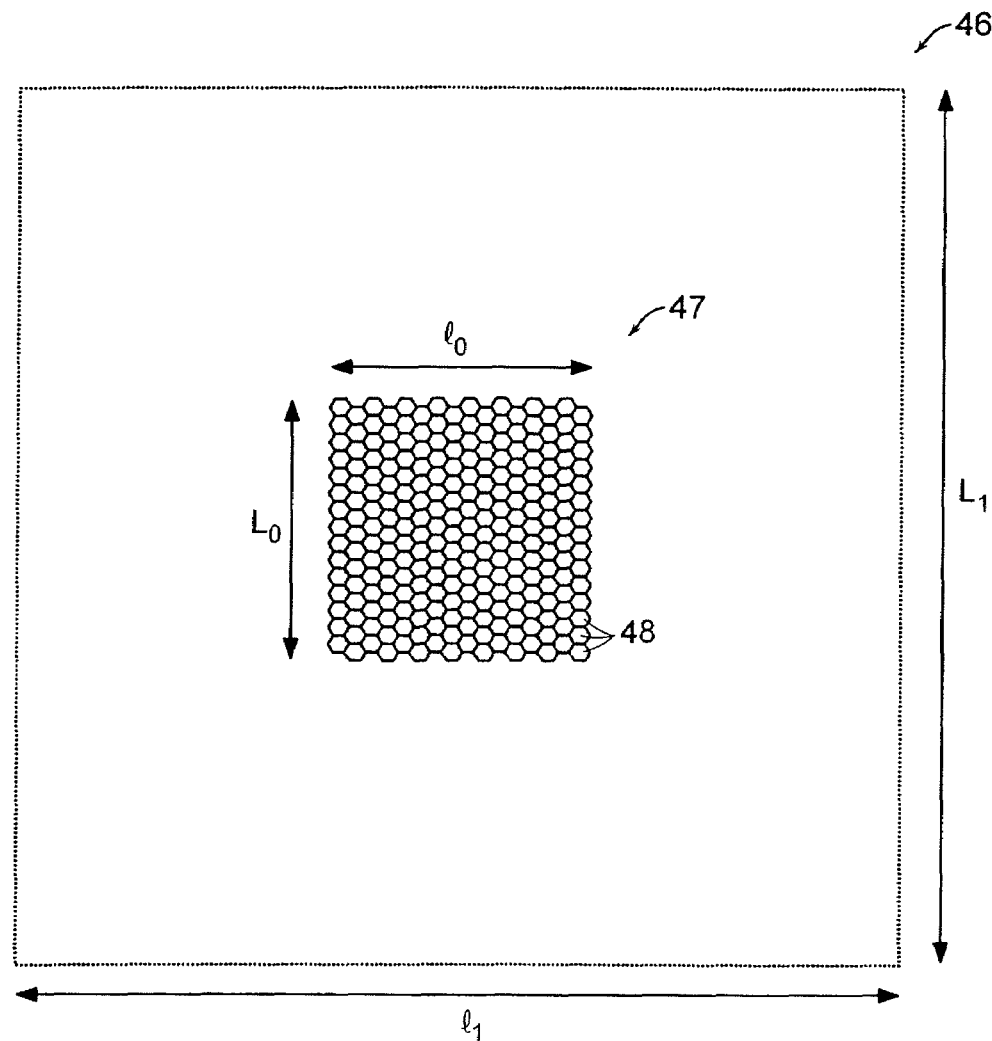
Figure 2D:
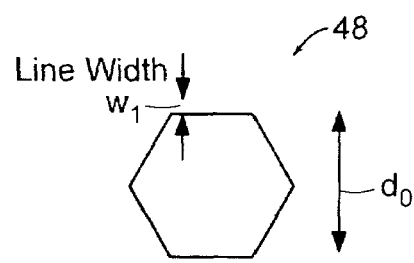

A stressed thin-film structure may be formed in accordance with the following process flow. Referring to FIG. 1, a substrate 10 may include a semiconductor material, such as double-sided polished silicon, and may have a diameter of, e.g., about 100 mm (not shown) and a thickness $t_0$ of, e.g., about 50-500 µm. A sacrificial layer 20 is formed over the substrate 10. The sacrificial layer may include a dielectric material, such as silicon dioxide ($SiO_2$). In an embodiment, the sacrificial layer 20 may be grown on both a front side 12 and a backside 14 of substrate 10 by, e.g., steam oxidation. Steam oxidation may be performed in, for example, in a furnace system available from Tystar Corporation, based in Torrance, Calif., in a steam ambient at 1050° C. The sacrificial layer 20 may have a thickness $t_1$ sufficiently thick to enable the subsequent formation of ribs 120 (see, e.g., FIG. 8) having a height at least equal to a thickness of the subsequently formed stressed thin-film membrane 190 (see, e.g., FIG. 11A). Thickness $t_1$ of the sacrificial layer may be, for example, approximately 2 µm.

Referring to FIGS. 2A-2D, a grid pattern 30 is defined in sacrificial layer 20 and substrate 10 by, e.g., photolithography and etching. A photoresist layer 40 is spun on, exposed, and developed over the sacrificial layer 20. The photoresist layer has a thickness $t_2$ that is sufficiently thick to withstand further processing, e.g., $t_2$ may be about 2 µm. The grid pattern 30, as initially defined by patterning the photoresist layer 40, may include an opening 45 having a width $w_1$ of, e.g., about 1.5 µm. The width $w_1$ of the opening 45 is selected such that the subsequently defined support grid structure 90 (see, e.g., FIG. 11A) will provide sufficient rigidity without drastically reducing the active area of membranes 190 (see, e.g., FIG. 11A).

The grid pattern 30 is defined by using a grid mask 46 to pattern the photoresist layer 40. The grid mask 46 includes a mask grid pattern 47 defining a plurality of cells 48. The mask grid pattern may have length $l_0$ of, e.g., about 750 µm and a height $h_0$ of, e.g., about 750 µm. Each cell may have a geometric shape, i.e., a hexagon with a distance $d_0$ between parallel sides of, e.g., 10 to 40 µm, in accordance with the design rules presented below. A plurality of cells may form a honeycomb pattern, as defined by the mask grid pattern. The grid mask may define a die having a height $h_1$ and a length $l_1$ of, e.g., about 10 mm each.

Figure 3:
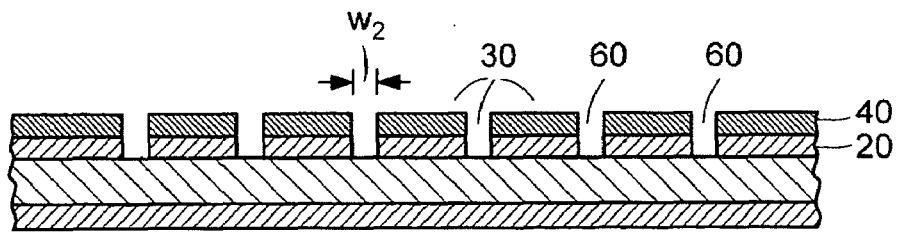

Referring also to FIG. 3, after the photoresist layer 40 is defined, portions 50 of the sacrificial layer 20 exposed by openings 45 in the photoresist layer 40 are removed by, for example, dry etching. Dry etching may be performed by, for example, reactive ion etching (RIE) in an etching system such as the AMT 8100 system, manufactured by Applied Materials, Santa Clara, Calif., with an etching recipe appropriate for the composition of the sacrificial layer, e.g., an oxide etch recipe. This etch may be an anisotropic etch that defines a plurality of openings 60 in the sacrificial layer 20 having a width $w_2$ that is approximately equal to $w_1$, e.g., about 1.5 µm.

Figure 4:
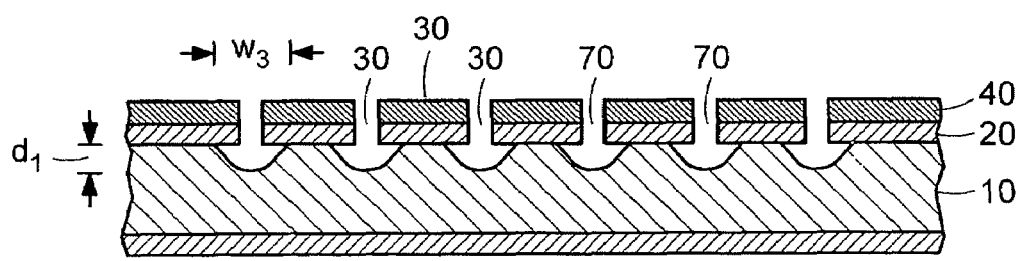

Referring to FIG. 4, after etching through sacrificial layer 20, an isotropic etch is performed, extending into substrate 10 to form a plurality of depressions 70. In an embodiment in which the substrate is formed of Si, this isotropic etch may be an sulfur hexafluoride ($SF_6$) etch performed for about 60-300 seconds by, e.g., a Multiplex system, manufactured by Surface Technology Systems, Wales, United Kingdom. This etch step defines depressions 70 in a substrate, where the depressions have a depth $d_1$ of, e.g., about 3-4 µm and a width $W_3$ of about 8 µm. Depth $d_1$ and width $w_3$ are selected such that the support grid 90, subsequently formed in part in depressions 70 (see FIG. 11A), provides adequate support for subsequently formed stressed thin-film membranes 190 (see FIG. 11A) without excessively reducing an active area of these membranes 190.

Figure 5:
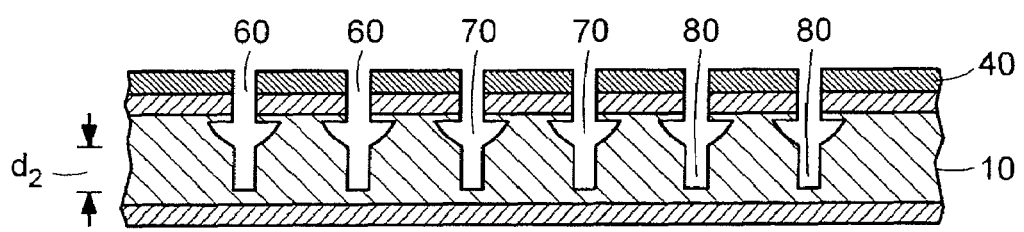

Referring to FIG. 5, the isotropic etch into substrate 10 is followed by an anisotropic etch to define a plurality of extensions 80 of the depressions 70. Extensions 80 may be trenches defined in the substrate. The extensions may be formed by, e.g., an anisotropic etch in a system such as the Multiplex system. In an embodiment in which the substrate 10 contains silicon, an appropriate etch may be a recipe that uses an $SF_6$ and octafluorocyclobutane ($C_4F_8$) chemistry. A method for anisotropically etching silicon is described in, for example, U.S. Pat. No. 5,501,893. Extensions 80 may each have a depth $d_2$ of, e.g., about 30-40 μm. The depth $d_2$ of extensions 80 is selected such that the material subsequently deposited in extensions 80 (see below) provides sufficient support, using the design rules for compressively stressed thin-film membranes presented below, to the subsequently formed stressed thin-film membrane, but sufficiently shallow such that gas flow to the membrane is not hindered. For some embodiments with tensilely stressed thin-film membranes, the extension may not be needed. After these etch steps, the photoresist layer 40 is stripped. The substrate 10 may then be cleaned by, e.g., an RCA clean followed by, e.g., a one-hour oxidation step at 800° C. to eliminate any residual polymer. The grid pattern 30, initially defined by photoresist 40, is now defined by openings 60, depressions 70, and extensions 80.

Figure 6:
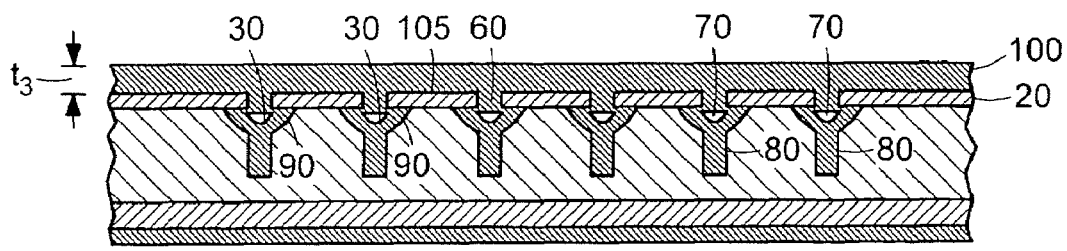

Referring to FIG. 6, a support grid 90 is defined by deposition of a support material 100 that may be, for example, a dielectric such as silicon-rich silicon nitride or $TiO_2$, over sacrificial layer 20 and into grid pattern 30, including openings 60, depressions 70, and extensions 80. The support material 100 may be deposited by, for example, chemical vapor deposition (CVD), e.g., low-pressure CVD (LPCVD) or plasma-enhanced CVD (PECVD). The support material 100 may be under low stress, e.g., <300 MPa, and may have a thickness $t_3$ of, e.g., about 2 μm. The compressive stress of the support material 100 should be sufficiently low to prevent buckling according to the compressive design rules presented below. The tensile stress is limited by the tensile strength of the support material 100. The support grid 90 may be formed from a dielectric material to prevent electrical shorts in the final structure, e.g., in a fuel cell embodiment.

Figure 7:
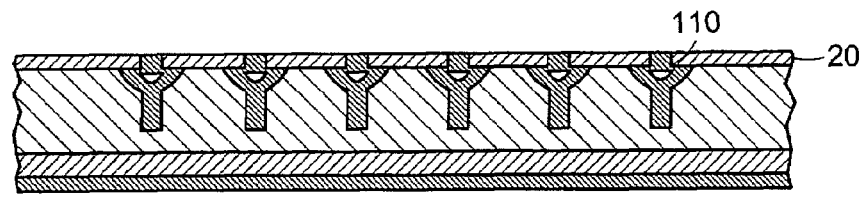

Referring to FIGS. 6 and 7, a top portion 105 of support material 100 is removed by, e.g., a dry etch, such as a nitride etch in the AMT 8100 system. Visual clearance endpoint detection may be used, with an over etch of approximately 5%.

Figure 8:
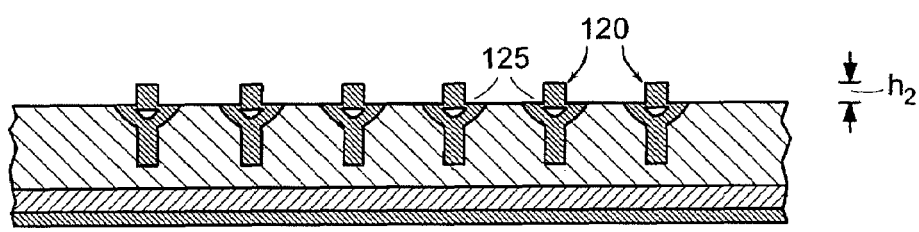

Referring to FIGS. 7 and 8, removal of the top portion 105 of support material 100 exposes a portion 110 of sacrificial layer 20. The sacrificial layer may be selectively removed by, for example, a wet etch. For example, in an embodiment in which the sacrificial layer includes oxide, it may be removed by an oxide etch such as a buffered oxide etch (BOE) that includes hydrofluoric acid, ammonia fluoride, and water. The removal of the sacrificial layer may be followed by a cleaning step such as an SC-1 ($NH_4OH:H_2O_2$) cleaning step, or an RCA clean followed by a one hour wet oxidation at 800° C. Removal of the sacrificial layer 20 exposes a portion of the support grid 90. This exposed portion includes rib 120 that has been formed by the deposition of support material 100 into opening 60 in sacrificial layer 20. The ribs 120 define generally the same pattern that had been originally defined by mask 47, e.g., a plurality of hexagons. The ribs have a height $h_2$ approximately equal to an initial thickness $t_2$ of the sacrificial layer, e.g., about 2 μm. The exposed portion of support grid 90 forms a shelf 125.

Figure 9:
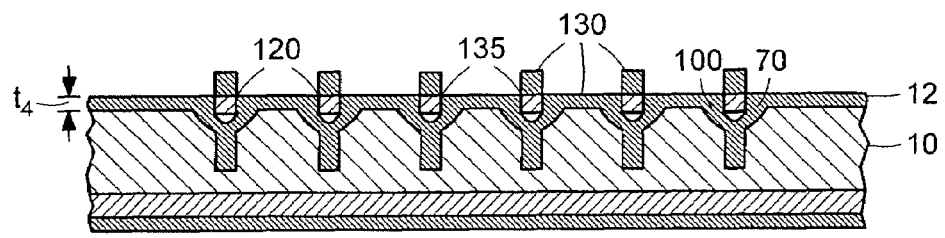

Referring to FIG. 9, a stressed thin-film layer 130 is formed over the ribs 120, exposed portions of front side 12 of substrate 10, and support grid 90, specifically over depressions 70 filled with support material 100. The stressed thin-film layer may be, e.g., deposited, such as by electron-beam evaporation. The stressed thin-film layer may include a membrane material that functions as an electrolyte material, for example, YSZ, or may include a membrane material that functions as an electrode, such as for example, a nickel/yttrium-stabilized zirconia composite. YSZ is a material particularly suitable for use as an electrolyte in a solid-oxide fuel cell because it is a material selectively permeable to oxygen ions at various partial pressures of oxygen. In summary, some materials that may be used as a membrane material to form the stressed thin-film layer include copper, nickel, palladium, platinum, rhenium, silicon carbide, aluminum nitride, an oxide such as an oxide of aluminum, cerium, chromium, cobalt, hafnium, iron, lanthanum, magnesium, manganese, samarium, scandium, silicon, strontium, titanium, ytterbium, yttrium, zirconium, praseodymium, and/or combinations thereof. The stressed thin-film layer 130 may have a thickness $t_4$ of, e.g., about 2 μm.

Depositing the stressed thin-film layer 130 over the ribs 120 may result in a formation of intentional discontinuities 135 in the stressed thin-film layer 130 proximate the ribs 120. These intentional discontinuities may be defined by controlling the step coverage of the stressed thin-film layer over the ribs. More specifically, nonconformal coating by the stressed thin-film layer 130 leads to the formation of discontinuities. The intentional discontinuities relieve stress in the stressed thin-film layer, thereby helping to prevent the formation of unintentional cracks.

Figure 10A:
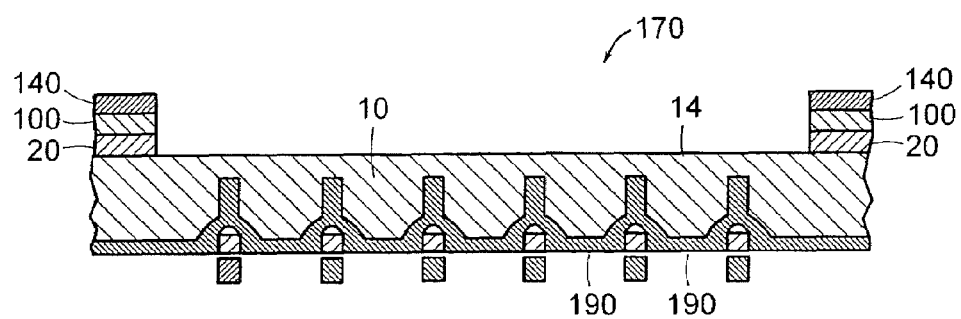
Figure 10B:
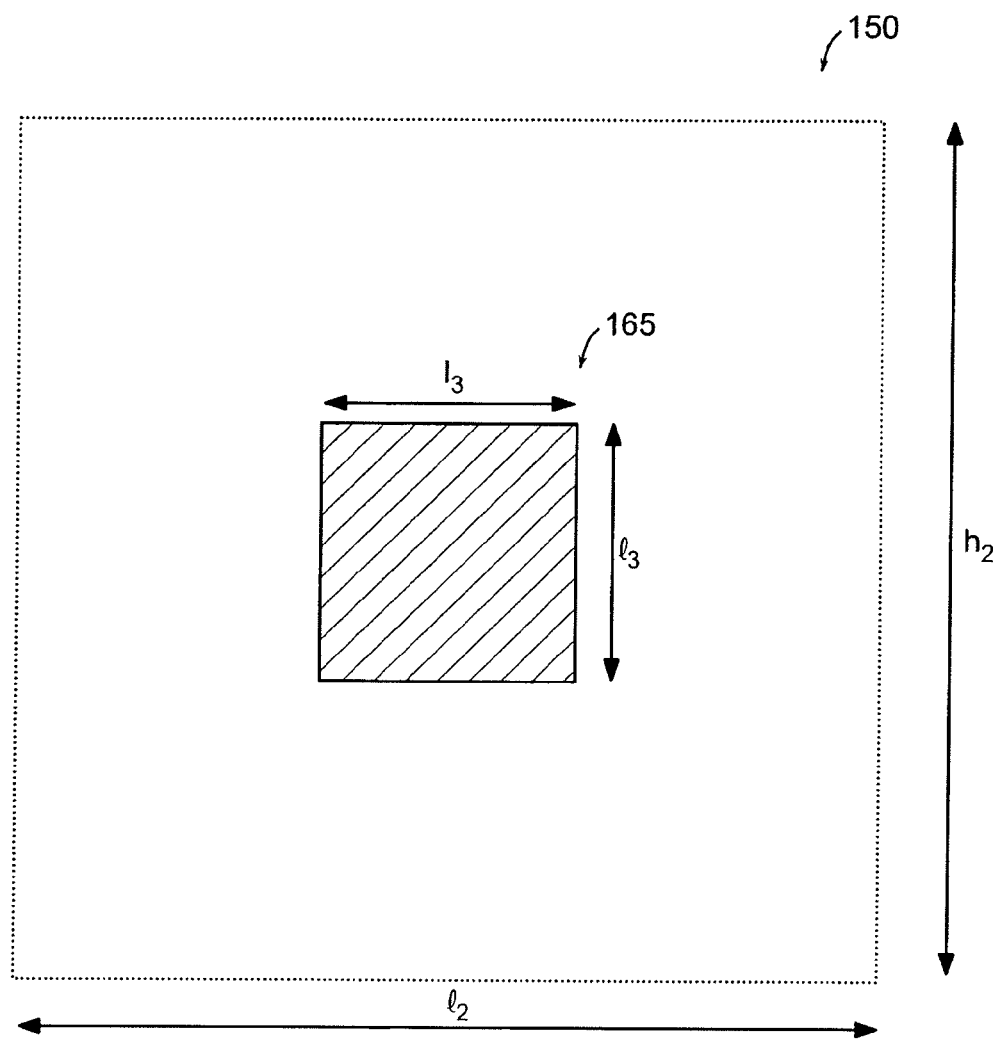

Referring to FIGS. 10A and 10B, a release photoresist pattern 140 is defined over the backside 14 of substrate 10. As defined by a release mask 150, the release photoresist pattern 140 may include a die 160 having a length $l_2$ and height $h_2$ of, e.g., approximately 10 mm each. A center portion of the die may define a square 165 having sides with a length $l_3$ of, e.g., about 1.2 mm. Through use of mask 150, photoresist is patterned over substrate backside 14 such that the photoresist 140 defines an open square 170 opposite support grid 90.

After the definition of release photoresist pattern, exposed portions of support material 100 and sacrificial layer 20 are removed. Both layers 100, 20 may be removed by, e.g., a dry etch in an AMT 8100 system from Applied Materials.

Figure 11A:
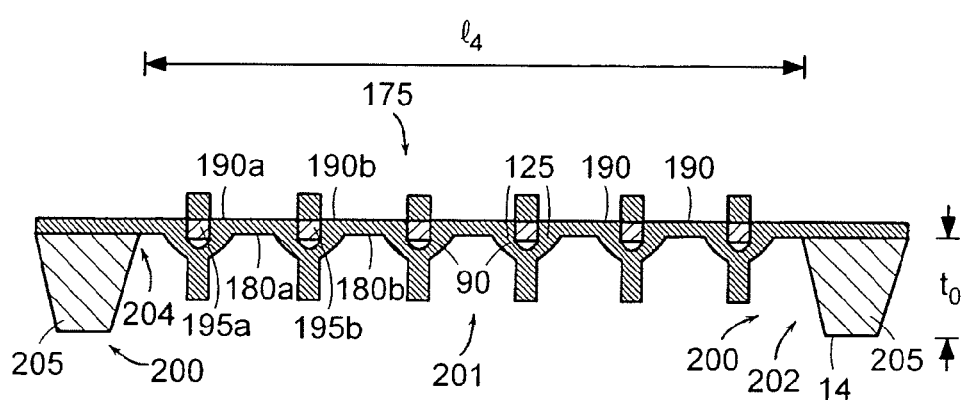
Figure 11B:
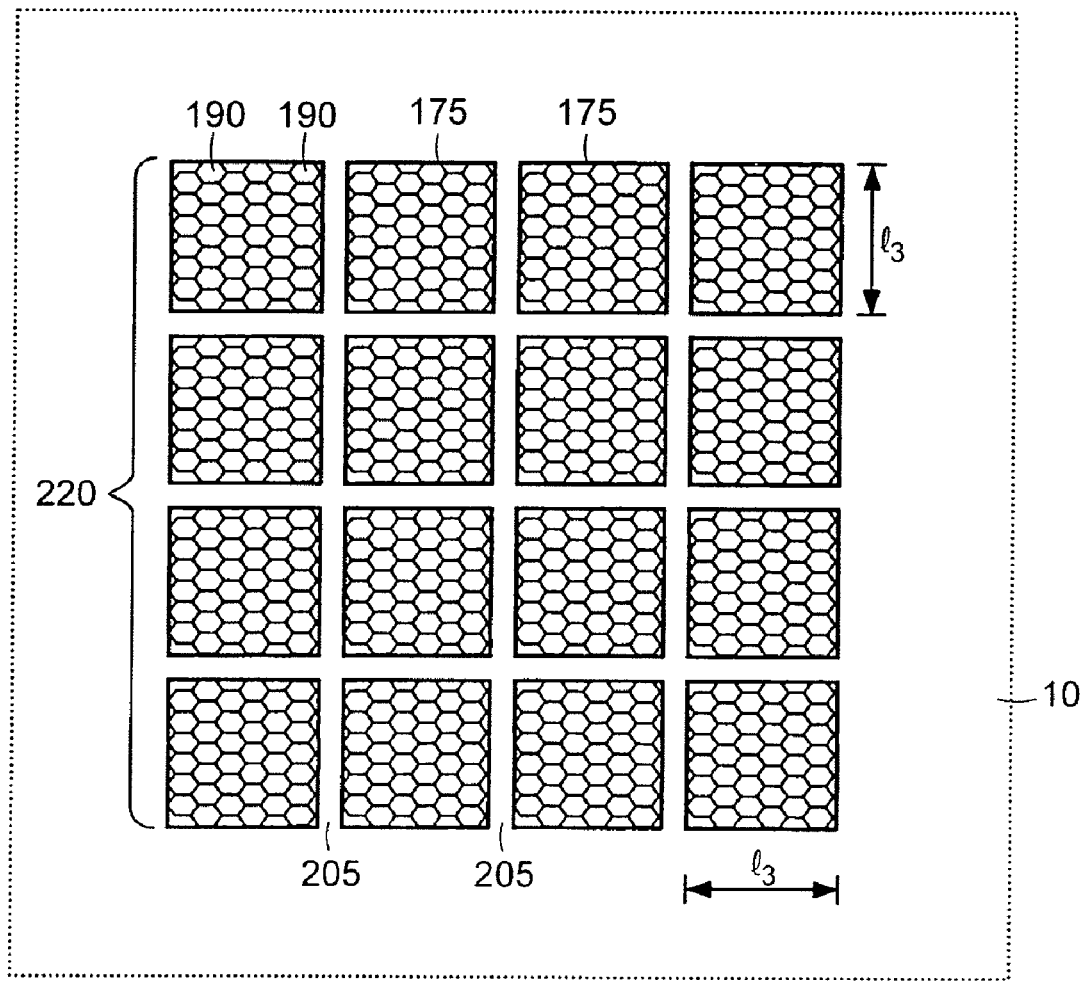
Figure 11C:
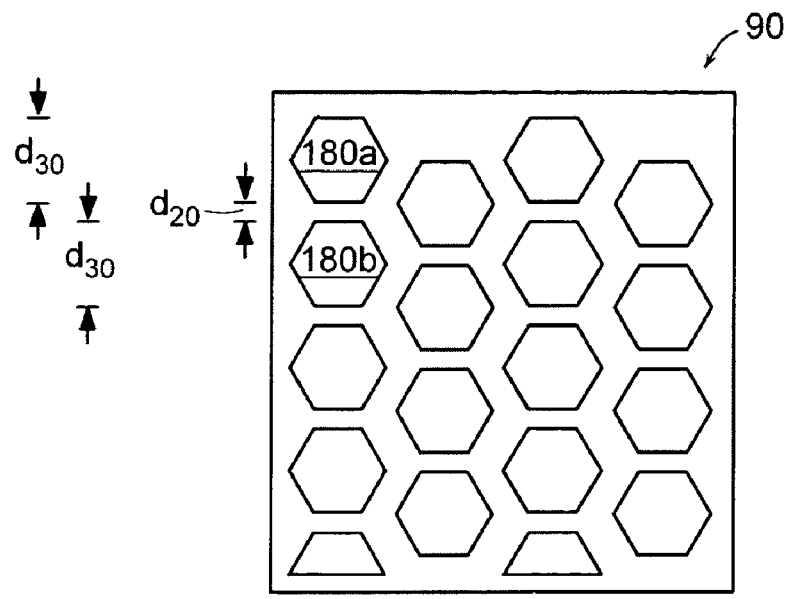
Figure 11D:
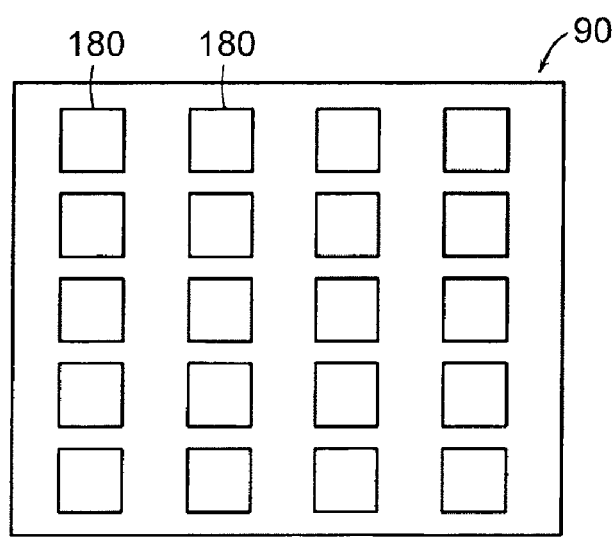
Figure 11E:
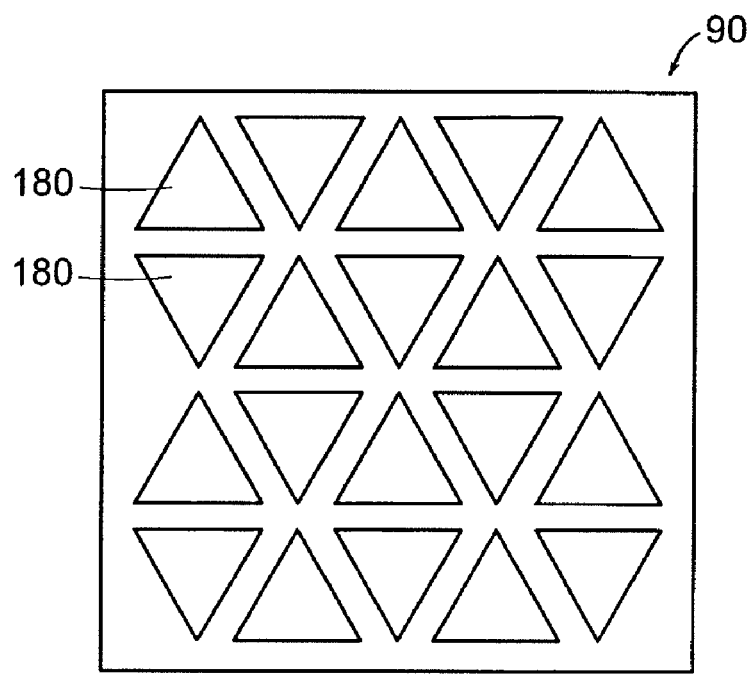
Figure 11F:
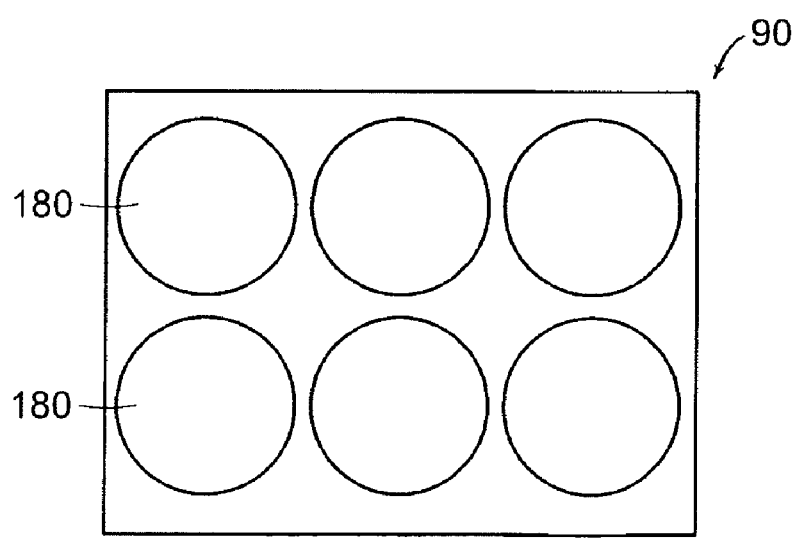

Referring to FIGS. 11A and 11B, exposed portions of the substrate 10 are removed by, for example, a wet etch. In an embodiment in which the substrate includes silicon, a suitable wet etch may be a potassium hydroxide (KOH) etch. This composition selectively etches silicon along certain planes, resulting in a frame 200 in a shape of a square-based, flat-topped pyramid, i.e., an opening 201 created by this etch will be broader at a bottom portion 202 at the backside 14 of substrate 10 and narrower at a top portion 204 proximate the support grid 90. For example, if sides of the opening 170 defined by a release mask 150 have a length $l_3$ of, e.g., approximately 1.2 mm each, the opening proximate the support grid 90 will have a length $l_4$ of, e.g., about 500 μm. Frame 200 is formed from a same material as substrate 10, e.g., silicon, and includes frame walls 205 having a thickness $t_0$ of, e.g., about 500 μm.

Referring to FIGS. 11A-11F, a result of the processing steps described above is a compound stressed thin-film membrane structure 175 having a support grid 90 defining a plurality of openings 180. Each of the openings 180 may have a hexagonal, square, triangular, or circular shape. A distance $d_{20}$ between first and second adjacent openings 180a, 180b may be less than a minimum dimension $d_{30}$ of each opening.

The stressed thin-film layer 130 defines a plurality of stressed thin-film membranes 190, e.g., electrolyte layers, disposed to occlude the openings 180. The plurality of stressed thin-film membranes 190 may include at least a first tensilely stressed thin-film membrane 190a and a second tensilely stressed thin-film membrane 190b, disposed to occlude a first opening 180a and a second opening 180b, respectively. Alternatively, the plurality of stressed thin-film membranes 190 may include at least a first compressively stressed thin-film membrane 190a and a second compressively stressed thin-film membrane 190b, disposed to occlude a first opening 180a and a second opening 180b, respectively. The stressed thin-film membranes (also referred to as "tiles") each contact at least a portion of the support grid 90. The first tensilely or compressively stressed thin-film membrane may contact at least a first portion 195a of the support and the second tensilely or compressively stressed thin-film membrane may contact at least a second portion 195b of the support. The portion of the support grid 90 contacted by the stressed thin-film membrane may be at least a portion of shelf 125.

The critical crack spacing and the critical aspect ratio for buckling are the geometric values at which the probability of failure through cracking or buckling is approximately equal to the probability of not cracking or buckling. In many practical applications, it is desirable to have a very high probability of not failing. In these cases it may be beneficial to add a factor of safety to the geometry. For example, the critical crack spacing may be up to two times the minimum dimension of the stressed thin-film membrane. Alternatively, the critical crack spacing may be up to ten times the minimum dimension of the stressed thin-film membrane. In the case of compressive films, the critical aspect ratio for buckling may be up to two times the ratio of the minimum opening dimension to the thickness of the stressed thin-film membrane. Alternatively, the critical aspect ratio for buckling may be up to ten times the ratio of the minimum opening dimension to the thickness of the stressed thin-film membrane.

These considerations may be taken into account in determining membrane materials and geometries. In some embodiments, each tensilely stressed thin-film membrane includes a membrane material having a characteristic crack spacing that is greater than one-half of a minimum dimension of the membrane and less than ten times the minimum dimension. This relationship may also be expressed as follows: the minimum dimension of the membrane is between twice and one-tenth the characteristic crack spacing. The membrane minimum dimension is determined by a minimum distance between two sides of a shape defined by the membrane. For example, each stressed thin-film membrane may have the shape of a hexagon, having a minimum dimension equal to a distance $d_0$ between parallel sides of, e.g., about 20 μm, as defined by the cells 48 of grid mask 46 (see FIGS. 2B and 2C). Further discussion of characteristic crack spacing is provided below in the discussion of the design rules.

The maximum dimension of the membrane may also be less than the critical buckling length. A compressively stressed thin-film membrane may include a membrane material having a critical aspect ratio for buckling that is greater than a ratio of one-half of a minimum dimension of the first opening to a thickness of the stressed thin-film membrane, and the critical aspect ratio for buckling is less than a ratio of ten times the minimum dimension of the first opening to the thickness of the stressed thin-film membrane. This relationship may also be expressed as follows: a ratio of the minimum opening dimension to the thickness of the stressed-thin film membrane may be between twice and one-tenth of the critical aspect ratio for buckling.

Further discussion of design rules for preventing buckling is provided below under the section heading "Overview of Design Rules for Compressive Stress."

In some embodiments, the stressed thin-film membrane may be tensilely stressed at a first operating condition and the membrane material may have a characteristic crack spacing greater than one-half of a minimum dimension of the first stressed thin-film membrane. At a second operating condition, the first stressed thin-film membrane may be compressively stressed and a critical aspect ratio for buckling of the membrane material may be more than one-half of a minimum dimension of the first opening.

Figure 11G:
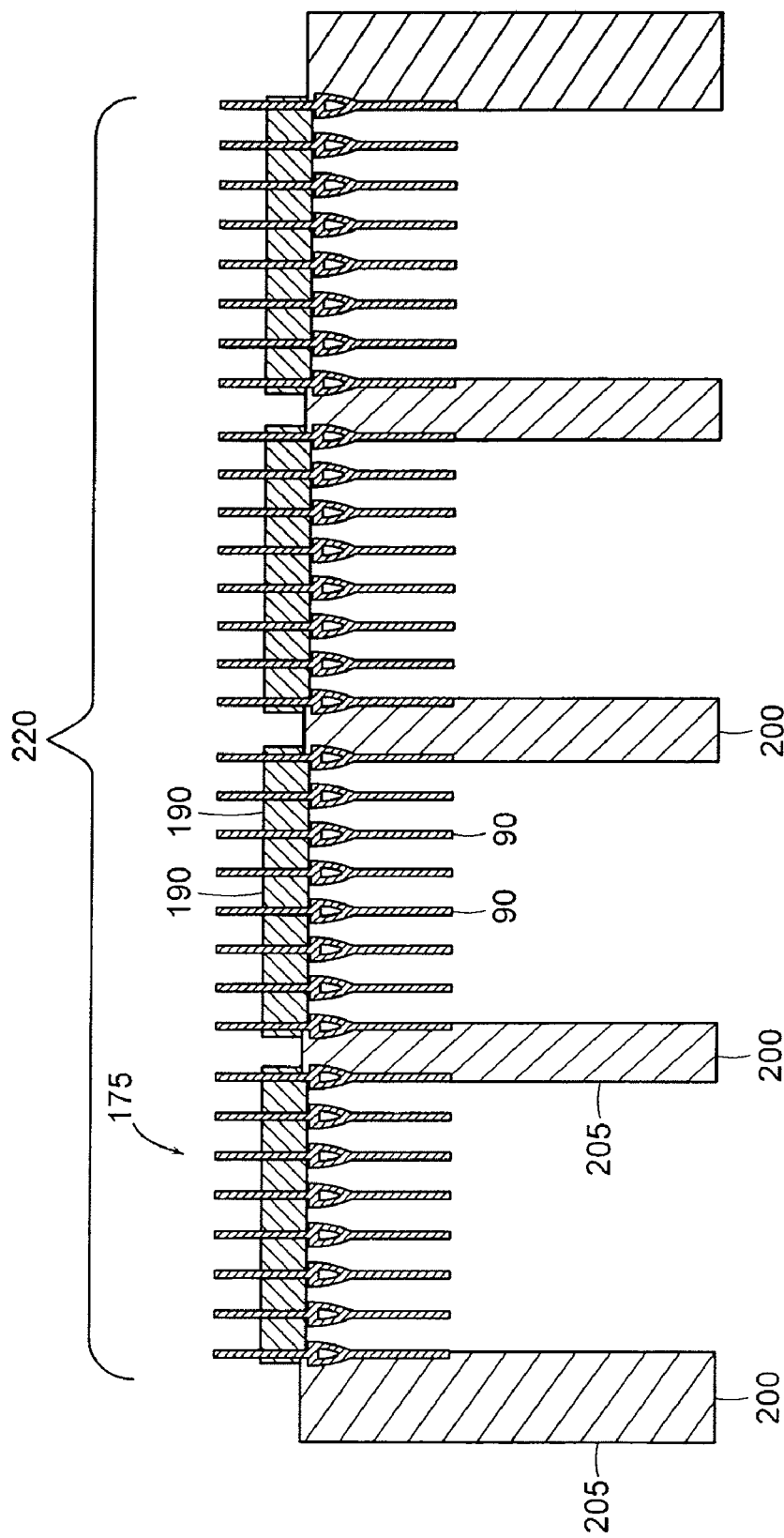

Referring to FIGS. 11B and 11G, compound stressed thin-film membrane structure 175 may be formed repeatedly across substrate 10, thereby creating a stressed thin-film membrane array consisting of two nested and repeating lattice structures, i.e., a smaller lattice compound stressed thin-film membrane structure 175 including the stressed thin-film membranes 190 disposed over support grid 90 and a larger lattice structure 220 including compound stressed thin-film membranes 175 disposed over frame 200.

The support grid discussed above produces a support having a "t" shape. In an alternative embodiment, ribs may be omitted from the compound stressed thin-film membrane structure by extending the removal of top portion 105 of support material 100 such that the rib is removed as well. In this embodiment, therefore, the support grid may have a "T" shape.

Figure 12:
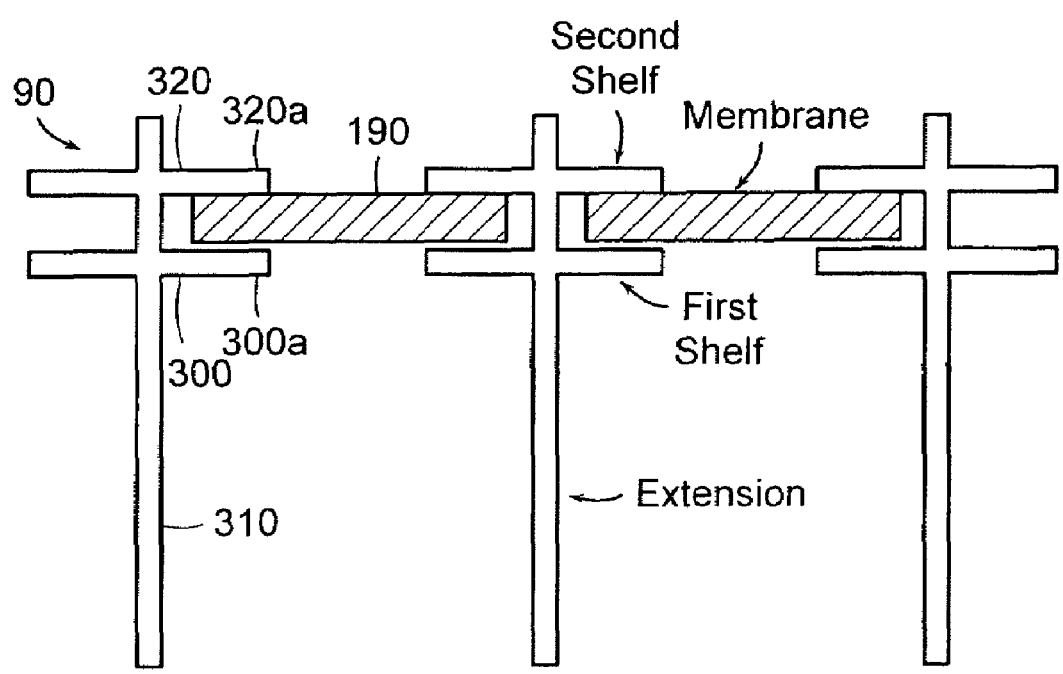
FIG. 12 is a schematic cross-sectional view of an embodiment of the invention.

It will be apparent to those skilled in the art that the support grid may have a variety of cross-sectional shapes. The grid preferably provides a surface for attachment of the stressed thin-film membrane. Referring to FIG. 12, a cross-sectional portion of the support grid 90 may define a first shelf 300 and an extension 310, and the tensilely or compressively stressed thin-film membrane 190 may contact a portion 300a of the first shelf. The cross-sectional portion of the support may also define a second shelf 320 disposed in parallel to the first shelf, and the stressed thin-film membrane may contact a portion 320a of the second shelf. In some embodiments, for example those with compressive films, the grid preferably has sufficient dimensions to provide rigidity to the membrane according to the compressive design rules provided below. It is found that a deeper grid provides more rigidity than a wider grid. In a preferred embodiment for compressive stressed thin-film membranes, the ratio of depth to width of the grid is greater than 10. In some embodiments, for example those with tensilely stressed films, the grid may not provide any significant rigidity. For example, the grid may be a flat thin film which spans from one stressed thin-film membrane to an adjacent stressed thin-film membrane. In other embodiments, particularly with compressively-stressed membranes, discontinuities in the membranes may not be needed and a single membrane may occlude more than one opening, e.g., two or more openings may be occluded by a single membrane.

In some embodiments of the invention, the grid comprises a dielectric. For example, in a fuel cell embodiment, the grid may be selected to be non-conductive to prevent shorting of the anode and cathode. In some embodiments of the invention, the grid comprises a diffusion barrier. For example, in a hydrogen purification embodiment, the grid may be selected from a material with a low diffusion coefficient for gasses.

Figure 13A:
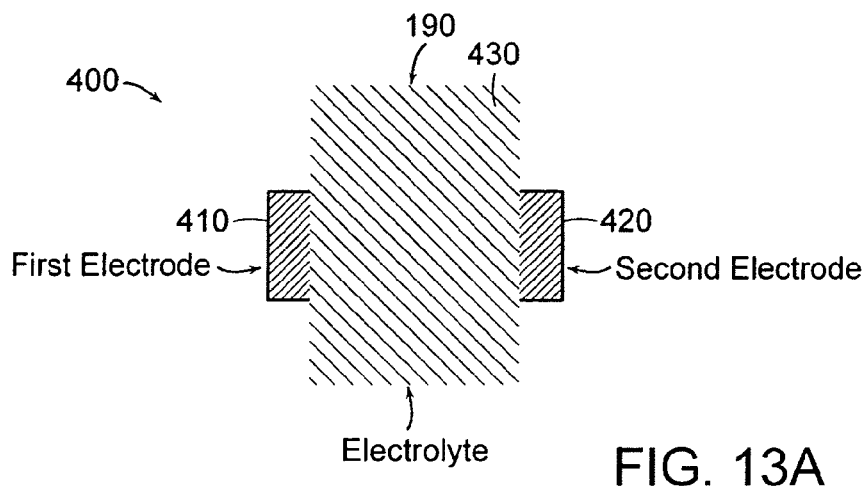
FIGS. 13a-13b are a schematic view of an embodiment of the invention in use with an electrochemical system and a solid oxide fuel cell.
Figure 13B:
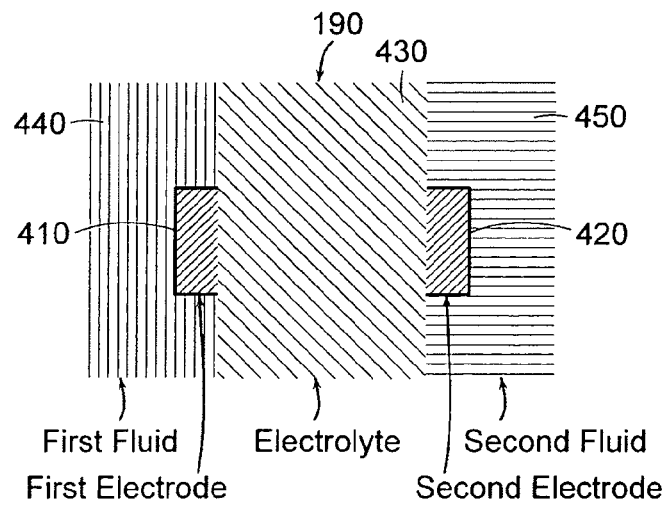

Referring to FIGS. 13a and 13b, in use, the stressed thin-film membrane 190 may be disposed in an electrochemical system 400. An electrochemical system includes at least a first electrode 410, a second electrode 420 and an electrolyte 430 arranged so that passage of current between electrodes causes a chemical reaction to occur. The electrolyte may be defined by the stressed thin-film membrane 190. The interaction of the chemical species with the electrodes also causes a voltage to be generated between the electrodes. Electrochemical systems can be used, for example, to generate power such as in a fuel cell. In other applications, electrochemical systems can be used to sense the presence or concentration of various chemical species. The present invention is particularly useful for electrochemical systems in which the first and second electrodes 410, 420 are in communication with both the electrolyte 430 and a first fluid 440 and second fluid 450 respectively, and it is desirable to maintain separation of the first and second fluid.

The stressed thin-film membrane may be disposed in a solid oxide fuel cell. Referring to FIG. 13b, the first fluid 440 may be a fuel and the second fluid 450 may be an oxidant. The first electrode 410 may be an anode, the second electrode 420 may be a cathode, and the electrolyte 430 may be a solid oxide fuel cell electrolyte defined by stressed thin-film membrane 190.

Figure 14:
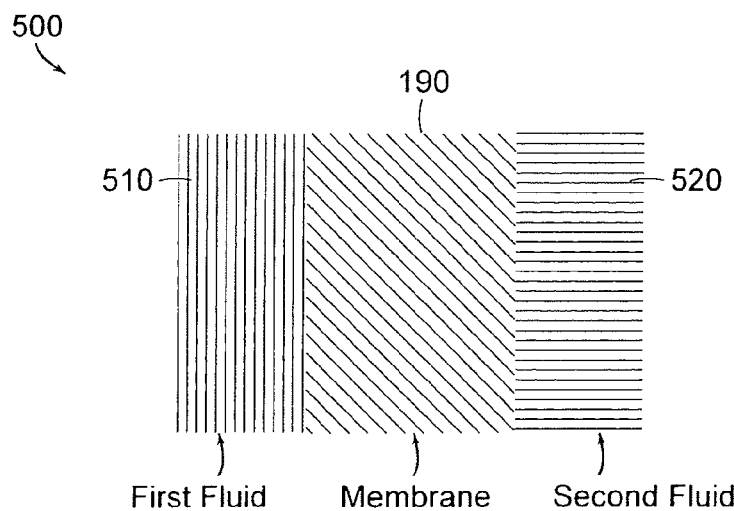
FIG. 14 is a schematic view of an embodiment of the invention in use with a hydrogen separation system.

Referring to FIG. 14, alternatively, the stressed thin-film membrane 190 may be disposed in a membrane-based hydrogen separation system 500. A membrane-based hydrogen separation system may include at least a first fluid 510, the membrane 190, and a second fluid 520, with the membrane separating the first and second fluids. The first fluid 510 may include hydrogen and at least a first diluent, with a first ratio of a hydrogen concentration to a first diluent concentration. The membrane 190 may include a material selected to be more permeable to hydrogen than to the first diluent. This selective permeability allows the second fluid 520 to have a second ratio of hydrogen to the first diluent that is higher than the first ratio. In some cases of membranes with extremely high selectivity, the second ratio may approach infinity. In some applications, a second diluent is added to the second fluid to transport the hydrogen away from the membrane.

Design Rules

In many embodiments, a compound stressed thin-film membrane structure may be subjected to a range of stresses during operation. For example, if the stress is caused in part by thermal expansion mismatch between stressed thin-film membranes and a support grid or between a compound stressed thin-film membrane array and frame, the stress will vary with temperature. In another embodiment, the stress may vary over time.

A design for a compound stressed thin-film membrane structure is provided, such that the structure is stable throughout the potential stress range. Generally, it is sufficient to design the structure to be robust at the extremes of the stress range. In embodiments with thermal expansion mismatch-based stress, the extremes generally occur at the highest and lowest operating temperatures. One object of this invention is to produce a membrane that is robust in both compression and tension.

A compound stressed thin-film membrane structure under excessive stress may fail, e.g., warp (i.e., buckle) or crack. Failure may occur by compression through cracks that form as a result of membrane buckling, for example, in the case of a YSZ membrane on silicon, at higher temperatures. Failure may also occur by formation of tensile cracks. In an embodiment with a YSZ stressed thin-film membranes and a silicon frame, failure by warping in compression at elevated temperature generally may initially be more likely than failure by cracking in tension. In this embodiment, however, tension cracking at lower temperatures may become more likely after many hours of device operation because of stress relaxation at elevated temperatures.

The compound stressed thin-film membrane structure has two features that may increase the robustness of a stressed thin-film membrane, such as a YSZ membrane, to tensile and compressive stress. Embodiments that include at least one of ribs (alternatively called "rails" or "ridges") and film discontinuities may act like stress relief joints, thereby both reducing the probability that new cracks will form and preventing cracks that may form from jumping from one stressed thin-film membrane to an adjacent stressed thin-film membrane. Any crack that forms, therefore, is isolated to an individual stressed thin-film membrane, and is prevented from causing failure of the compound stressed thin-film membrane structure. The support grid imparts stiffness to the compound stressed thin-film membrane structure. This additional stiffness may, in some embodiments, prevent or reduce warping of stressed thin-film membranes and the compound stressed thin-film membrane structures under compressive stress.

In some embodiments, particularly with compressively stressed thin-film membranes, film discontinuities may not be needed to reduce the risk of cracks. A single membrane may, therefore, occlude more than one opening, e.g., two or more openings may be occluded by a single membrane.

Truly robust compound stressed thin-film membrane structures may be achieved by the application of a set of geometric design rules intended to prevent the occurrence of warping and cracking. These design rules, applicable to many geometries, have been developed based on a synthesis of knowledge gained experimentally from the compound stressed thin-film membrane structure having ribs, a support grid, and a plurality of stressed thin-film membranes.

These design rules are useful for producing more robust membranes, for example membranes that are better able to tolerate thermal cycling, than membranes produced without taking into consideration the relationships described herein.

In embodiments with membranes having thermal expansion rate different from that of the frame, thermal cycling of the stressed thin-film membranes may subject the membranes to alternating states of compression and tension. For example, in an embodiment in which a substrate is made of Si and the stressed thin-film membranes are formed from YSZ, the coefficients of thermal expansions (CTE) differ significantly: the CTE of YSZ is approximately 10 µm/m/° C., while that of Si and Si-rich silicon nitride are approximately 4 µm/m/° C. Because the YSZ thermal expansion coefficient is nearly three times larger than that of Si and Si-rich silicon nitride, a hot YSZ membrane expands against the constraint of its relatively fixed support grid and Si frame and is in a state of compression. Conversely, a membrane that has been cooled from a relaxed state at its operational temperature will be stretched by the support grid and Si support frame into a state of tension.

The stress difference between room temperature (30° C.) and operating temperature of 800° C. may be expressed as:

$$\text{Stress} = E(\alpha_X(T_2 - T_1) - \alpha_Y(T_2 - T_1)) \tag{0}$$

$$= E(\alpha_{YSZ}(800 - 30) - \alpha_{Si}(800 - 30))$$

$$\approx 1200 \text{ megapascals (MPa)}$$

where
E=Young's Modulus of the membrane,
α=coefficient of thermal expansion, and
T=temperature.

In an embodiment, the compound stressed thin-film membrane structure can withstand a 2000 MPa change in the stress state of the stressed thin-film membrane without failure. In some embodiments, the compound stressed thin-film membrane structure can withstand tensile stresses as high as 800 MPa. In still other embodiments, the compound membrane structure remains free of bow when it is in a compressive state as high as 1200 MPa.

As described above, the stressed thin-film membrane structure can include at least two nested, repeating lattice composite structures to provide adequate stiffness or rigidity to the stressed thin-film membrane. The two nested structures may be built with different length scales, with different materials and material thicknesses, defined in successive fabrication steps.

The repeat distance or diameter of the smaller of the two lattices may be only 10 to 40 µm, with a smallest repeating unit being a "cell." The cell may have a hexagonal shape and includes a free-standing YSZ thin film plate or "tile" (also referred to as "stressed thin-film membrane") along with its mechanical frame or support grid. YSZ thin films are typically 0.25-2 µm thick. The support grid is a mechanical support structure that holds the YSZ tiles. The cell wall, i.e., a portion of the support grid, may be formed from a dielectric such as silicon-rich silicon nitride and may have a width of 1-3 µm and a depth of 30-150 µm. The support grid may also include a shelf that may have a width of 1-5 µm. The silicon-rich silicon nitride lattice may form a flat open honeycomb structure, with a side, i.e., a top, of each cell sealed with the thin film YSZ.

The compound stressed thin-film membrane structure may be a close-packed 2-dimensional cell-array of the stressed-thin film membranes. It is the smallest repeat unit of a larger structure, i.e., a compound stressed thin-film membrane array. The compound stressed thin-film membrane array may have a diameter of, for example, 5-100 mm, with each of the compound stressed thin film membranes having a diameter between 200 µm to 2 mm. Each member of the compound stressed thin-film membrane array includes its own compound stressed thin-film membrane plus an additional intervening mechanical structure—the "membrane wall" frame. In an embodiment, the frame may be composed of silicon with a thickness of 50 to 500 µm. The thicker frame walls are defined in a processing step, e.g., an etch step, separately from the formation of the cells and cell walls, i.e., the membranes and the support grid.

Two methodologies are presented for determining advantageous dimensional relationships between the thickness of the stressed thin-film membrane tile material, e.g., YSZ, the thickness and depth of the cell wall, e.g., silicon-rich silicon nitride, the diameter of a cell, the thickness and depth of the membrane wall, and the diameter of the compound membrane. The first set of relationships applies to embodiments that experience significant tensile stresses. The second set of relationships applies to embodiments that experience significant compressive stresses. Application of the relationships applicable to cases of significant compressive, tensile, or both compressive and tensile stresses enables the formation of stressed thin-film membranes and compound stressed thin-film membrane arrays substantially free of warp and cracking.

Overview of Design Rules for Tensile Stress

A maximum dimension a tensilely stressed thin-film membrane may have without cracking is determined by the characteristic crack spacing of the film. A tensilely stressed thin film is defined here as a film that will spontaneously develop cracks when the lateral dimensions of the film are sufficiently large. The occurrence of cracks is dependent upon, for example, the internal stress state of the film, the thickness of the film, the roughness of each surface of the film, the adhesion of the film to the substrate, the composition, and the frequency and character of film defects.

When a crack forms in a tensilely stressed thin-film, local stress in the film is partially relieved, thereby reducing the probability of an additional crack forming near the first crack. The combined effect of the global tendency towards cracking and the local stress relief resulting from a crack generally causes the distance between substantially parallel cracks to cluster around a characteristic crack spacing, with some scatter around that characteristic crack spacing due to random processes. This crack formation has the appearance of a dried and cracked lakebed with relatively uniform sizes of uncracked areas.

In some embodiments, the characteristic crack spacing may be anisotropic, with certain directions cracking at a higher frequency than other directions. One technique for quantifying the directional characteristic crack spacing is as follows:

(A) Obtain a micrograph of the film by, e.g., a dark-field optical microscope.
(B) Select a sampling region sufficiently large to be representative of the film. The area may extend at least 10 crack spacings in each direction, and preferably at least 100 crack spacings.
(C) If there is a crack in the sampling region that does not terminate at another crack, i.e., has a free end, with a pen, extend the crack until it intersects another crack.
(D) Find the center of gravity of each island of film. An island is defined as an area of film that is surrounded by cracks (and extended cracks from C), and that does not contain any cracks. To find the center of gravity, one technique is to bisect each island with a straight line such that the areas on each side of the line are equal. Repeat the bisection with a perpendicular line. The intersection of the two bisection lines is the center of gravity of the island.
(E) Label each island with a uniform coordinate system so that the absolute orientation of the islands can be maintained. Section the micrograph along all of the cracks so that the islands can be moved independently. Superimpose all of the islands of film aligning the center of gravity of each film, while maintaining the absolute orientation of each island.
(F) In each direction, the characteristic crack spacing may be found by averaging the diameter of the islands along the selected axis. The standard deviation may also be found along the axis.

Preferably the diameter of the island, e.g., a stressed thin-film membrane, is less than twice the crack spacing in all directions. More preferably, the diameter of the cell is less than one-half of the crack spacing in all directions.

The dimensions of the tensilely stressed thin-film membrane are defined by the edges of the membrane. The edges may be defined by any intentional non-uniformity in the membrane that prevents or substantially reduces the transfer of stress across the non-uniformity region. Most preferably, the edges are defined by a discontinuity in the stressed thin-film membrane material. Alternatively, the edge may be a stress-relief joint or a crack-inducing shape.

The invention preferably separates each island in such a way as to reduce the frequency of crack formation in each island and to reduce the frequency of crack propagation between adjacent islands.

One structure in accordance with the invention includes stressed thin-film membrane islands that are discontinuous. The distance between adjacent islands is selected such that the islands do not come in contact during at least some portion of time while operating. The space between adjacent islands may be formed in some embodiments by photopatterning and etching. In another embodiment, the space may be filled with another material, for example low-stress silicon nitride. In another embodiment, the space may be formed by including a rail over the support grid and eliminating the step coverage during deposition of the stressed thin-film material, resulting in a discontinuous film over the rail.

Another structure in accordance with the invention includes a stress-relief joint between adjacent islands. In one embodiment, joint may be in the form of a "U" such that the arms of the "U" can move together or apart to relieve stress. In another embodiment, the joint may be formed from a material other than a stressed thin-film material.

A third structure in accordance with the invention includes a feature designed to cause the stressed-thin film to crack in a controlled location. In one embodiment, the film may be deposited continuously over a step feature. Cracks will preferentially form parallel to the step and within a distance from the step approximately equal to the film thickness.

Preferably the compound stressed thin-film membrane includes a structure that separates each island to reduce the frequency of crack formation in each island and to reduce the frequency of crack propagation between adjacent islands.

Overview of Design Rules for Compressive Stress

A maximum dimension that a stressed thin-film membrane may have without buckling may be determined by applying an Euler's formula for the buckling of thin plates (see equation 1 below). This equation yields a relationship between the thickness of the stressed thin-film membrane (t), a length of the stressed thin-film membrane (L in the instance of a square cell), and maximum tolerable compressive stress ($\sigma$). This rule is intended to ensure that the stressed thin-film membranes remain free of bow, i.e., will not buckle.

In an embodiment, a stressed thin-film membrane has a square shape, supported only by its edges. Here a critical aspect ratio for buckling, i.e., a minimum length to thickness ratio that may be tolerated before buckling occurs, may be calculated by applying an Euler formula, e.g., Equation 1:

$$\frac{L}{t} = \sqrt{\frac{\pi^2 E}{3(1-v^2)\sigma}} \quad (1)$$

where
L=Length of the square,
t=Thickness of the film,
v=Poisson ratio of the film,
$\sigma$=Compressive stress in the film, and
E=Young's modulus of the film:

This formula is relatively conservative in that tiles and membranes are frequently at least partially clamped at their edges. The critical aspect ratio will be larger for clamped edges, so this ratio of L/t may be considered to be a lower bound.

This Euler's formula assumes a square shape. The critical aspect ratio for hexagons and other shapes varies somewhat, but is expected to be within 30% of this value.

A simplification of the rule may be that, to avoid buckling, a ratio of cell diameter to membrane film thickness should generally be not greater than 20. This value is based on the assumptions that most stressed films have internal stress of <1 GPa, most Young's moduli of brittle films are ~150 GPa, and most Poisson ratios are ~0.25. In some cases the ratio may be as large as 40.

In the case of a compound stressed thin-film membrane, a maximum dimension may also be determined by an Euler formula for the buckling of a thin composite plate. One may use Equation 1 below, with the effective variables for the structure under consideration. The equation provides a relationship between the flexural rigidity of the membrane (the stiffness or effective thickness of the cell materials, i.e., the walls and tiles), the membrane diameter, and the maximum tolerable compressive stress. This rule is intended to ensure that the compound stressed thin-film membrane will not buckle. The effective membrane thickness and modulus are determined, primarily, by the dimensions of the silicon-rich silicon nitride cell walls. The three factors that determine the ratio of the component materials parameters and the effective membrane thickness and modulus are the support grid width, the support grid depth, and cell diameter.

The cell support grids may be designed with a particular height or topography (e.g., with ribs) to break the planar continuity of the stressed thin-film membrane. The purpose of the rib is to create a discontinuity in the stressed thin-film layer that allows for some stress relaxation of the stressed thin-film material and acts as a termination point for any unintended cracks in the stressed thin-film material. This height is selected to be similar to the film thickness, e.g., 2 µm.

In the case of a compressively stressed thin-film membrane array, the dimensions of the frame, e.g., silicon walls, may be set by yet another application of an Euler formula. Again, one applies Equation 1, with an allowance for the shape of each compound membrane. This equation provides a relationship between the flexural rigidity of the complete compound stressed thin-film membrane array (the effective thickness of all membrane, grid, and frame materials), the diameter of the complete compound stressed thin-film array, and the maximum tolerable compressive stress. This rule is intended to ensure that the compound stressed thin-film membrane array will not bow, i.e., will not buckle. To ensure relatively high yields, this aspect ratio may be less than 2 times the minimum dimension of the first opening to the membrane thickness. The effective array thickness and modulus are primarily determined by the dimensions of the membrane walls. The three factors that determine the ratio of the component materials parameters and the effective array thickness and modulus are the membrane wall width, the membrane wall thickness, and membrane diameter.

To apply Equation 1 to a YSZ stressed thin-film membrane, one may use the following approximate values:

E=160 GPa v=0.23

$\sigma$=1 GPa

Using the above Equation 1, the critical aspect ratio, i.e., the maximum length to thickness ratio one may use before buckling occurs is:

L/t=23.6

Therefore, in an embodiment in which the thickness of the stressed thin-film membrane is 2 µm, one may form tiles with a maximum width 47 µm without buckling.

For the compound stressed thin-film membrane (many tiles), the calculation of maximum dimensions possible prior to occurrence of failure is more difficult because the membrane is no longer a solid piece of material. The actual materials parameters in Equation 1 must be substituted with effective parameters that include the effects of geometry, stress and materials parameters of the components of the compound stressed thin-film membrane. For example, the effective Young's modulus for a hexagonal honeycomb is:

$$E^* = E \cdot 2.3\left(\frac{w}{a}\right)^3 \quad (2)$$

where
 w=Width of the walls
 a=Length of each wall
See *Cellular Solids* by L. J. Gibson and M. F. Ashby (Second Edition, 1997).

The effective compressive stress will also be reduced by the thickness of the membrane:

$$\sigma^* = \sigma\frac{b}{t} \quad (3)$$

where
 b=Thickness of the YSZ
 t=Thickness of the honeycomb

This formula is relatively conservative in that it does not include any contribution to membrane strength from the YSZ tiles or the "shelf." However, it also does not take into account that the stress is primarily applied to the top of the membrane, which will tend to encourage buckling.

A characteristic hexagonally shaped membrane has the following properties:
E=160 GPa
v=0.25
σ=1 GPa
t=40 μm
w=1.5 μm
b=2 μm
a=20 μm/sqrt(12)=5.8 μm (This factor converts the diameter of a hexagon into the length of a side)
→σ*=50 MPa
→E*=6.45 GPa By substituting the starred quantities into Equation 1, one obtains
→L/t=21.3
→L=0.85 mm Note: Other honeycomb geometries, for example, triangular cells, may have very different effective Young's Moduli. As an example, the equation for the effective Young's modulus for triangular cells is:

$$E^* = E \cdot 1.15\left(\frac{w}{a}\right) \quad (4)$$

See *Cellular Solids*. For a YSZ membrane, E*=52 GPa, and L/t=68, yielding a maximum dimension of L=3.4 mm in an embodiment with a triangular cell.

Despite the possibility provided by a triangular shape of having a larger maximum dimension before the occurrence of buckling, in comparison to a hexagonal shape, hexagonally shaped stressed thin-film membranes may be preferable. The latter provide a higher ratio of active area to support grid area than is provided by honeycomb structures with triangular cells.

It is noted that fabrication of stressed thin-film membranes in accordance with the methods described above has resulted in increases of yield of about 80% for membranes subjected to thermal cycling up to 800° C.

Throughout the description, where compositions are described as having, including, or comprising specific components, or where processes are described as having, including, or comprising specific process steps, it is contemplated that compositions of the present invention also consist essentially or, or consist of, the recited components, and that the processes of the present invention also consist essentially of, or consist of, the recited processing steps.

It should be understood that the order of steps or order for performing certain actions is immaterial so long as the invention remains operable. Moreover, two or more steps or actions may be conducted simultaneously.

The invention may be embodied in other specific forms without departing from the sprit or essential characteristics thereof. The foregoing embodiments are therefore to be considered in all respects illustrative rather than limiting on the invention described herein.

Each of the patent documents and scientific publications disclosed hereinabove is incorporated by reference herein for all purposes.

What is claimed is:

1. A fuel cell assembly comprising:
 a membrane assembly having
  a support defining an opening; and
  a stressed thin-film membrane having an active area occluding the opening and an extended area extending laterally beyond the opening, the extended area coupled to at least one portion of the support, the stressed thin-film membrane having a thickness and having a shape, the shape having lateral dimensions of less than about 80 microns.

2. The fuel cell assembly of claim 1 further comprising:
 first and second electrodes, the membrane assembly at least partially disposed between the first and second electrodes.

3. The fuel cell assembly of claim 1, wherein the shape has a dimension of less than about 40 microns.

4. The fuel cell assembly of claim 1, wherein the support defines a plurality of openings, and the membrane assembly includes a plurality of stressed thin-film membranes, each stressed thin-film membrane coupled to at least one portion of the support and occluding a corresponding opening, and each thin-film membrane having a shape, each shape having a dimension of less than about 80 microns.

5. The fuel cell assembly of claim 4, wherein a distance between two adjacent openings is less than about 80 microns.

6. The fuel cell assembly of claim 4 further comprising:
 a frame, wherein the membrane assembly is coupled to at least one portion of the frame.

7. The fuel cell assembly of claim 6 further comprising:
 a plurality of membrane assemblies, wherein each membrane assembly is coupled to at least one portion of the frame.

8. The fuel cell assembly of claim 1, wherein the support includes a first shelf, and the stressed thin-film membrane is coupled to at least one portion of the first shelf.

9. The fuel cell assembly of claim 8, wherein the support includes a second shelf disposed approximately parallel to the first shelf, and the stressed thin-film membrane is coupled to at least one portion of the second shelf, the stressed thin-film membrane disposed between the at least one portion of the first shelf and the at least one portion of the second shelf.

10. The fuel cell assembly of claim 1, wherein the support includes at least one rib, the thin-film membrane adjacent to the at least one rib.

11. The fuel cell assembly of claim 1, wherein the shape of the thin-film membrane is selected from the group consisting of hexagonal, square, triangular, and circular.

12. The fuel cell assembly of claim 1, wherein the opening has a shape, and the shape of the opening is selected from the group consisting of hexagonal, square, triangular, and circular.

13. A method of forming a fuel cell assembly, the method comprising:
    forming a support defining an opening; and
    forming a stressed thin-film membrane on at least one portion of the support, the stressed thin-film membrane having an active area occluding the opening and an extended area extending laterally beyond the opening, the thin-film membrane having a thickness and a shape, the shape having lateral dimensions of less than about 80 microns.

14. The method of claim 13 further comprising:
    providing first and second electrodes, the support and the stressed thin-film membrane at least partially disposed between the first and second electrodes.

15. The method of claim 13, wherein the shape has a dimension of less than about 40 microns.

16. The method of claim 13, wherein the support defines a plurality of openings, and the method includes forming a plurality of stressed thin-film membranes, each stressed thin-film membrane formed on at least one portion of the support and occluding a corresponding opening, and each thin-film membrane having a shape, each shape having a dimension of less than about 80 microns.

17. The method of claim 16, wherein a distance between two adjacent openings is less than about 80 microns.

18. The method of claim 16, further comprising:
    forming a frame, wherein at least one portion of the support or the stressed thin-film membrane is formed on at least one portion of the frame.

19. The method of claim 13, wherein the support includes a first shelf, and the stressed thin-film membrane is formed on at least one portion of the first shelf.

20. The method of claim 19, wherein the support includes a second shelf disposed approximately parallel to the first shelf, and the stressed thin-film membrane is formed on at least one portion of the second shelf, the stressed thin-film membrane disposed between the at least one portion of the first shelf and the at least one portion of the second shelf.

21. The method of claim 13, wherein the support includes at least one rib, and the thin-film membrane is formed adjacent to the at least one rib.

22. The method of claim 13, wherein the shape of the thin-film membrane is selected from the group consisting of hexagonal, square, triangular, and circular.

* * * * *